MEANS FOR REELING CODED TAPE

Filed Oct. 6, 1955

INVENTOR
JASPER GILBERT DRESSER
BY
Maxwell J. Berrotta
ATTORNEY

United States Patent Office 2,896,872

Patented July 28, 1959

2,896,872

MEANS FOR REELING CODED TAPE

Jasper Gilbert Dresser, Cranston, R.I., assignor to Dresser Products Incorporated, Cranston, R.I., a corporation of Rhode Island Application October 6, 1955, Serial No. 538,979

2 Claims. (Cl. 242—61)

The present invention relates to an improved means for reeling and filing coded tape.

Heretofore considerable difficulty has been encountered with respect to the storage of coded tapes such as is produced on various commercial machines such as, for example, are made by Commercial Controls Corporation under the trademarks Flexowriter or Justowriter. It is conventionally desired to store the coded tape with the master sheet or other commercial paper on which is typed the information of the coded tape. In many instances, the tape is merely placed in an ordinary envelope and inserted into the file next to the commercial paper abovementioned. Inasmuch as in many instances the commercial paper has affixed thereto a number of other papers such as orders which supply the information on the master sheet and thus the tape, such procedure unduly produces bulk in the files. Thus the capacity of the filing cabinet or other storage cabinets becomes limited and it has therefore become desirable to provide an arrangement whereby coded tape can be stored with such a master sheet without unduly increasing the thickness of the papers being filed.

Accordingly instead of merely stuffing the tape into an envelope as is sometimes done, I provide means whereby the tape can be conveniently reeled so as to result in a flat reel of tape which can easily be inserted into an envelope of selected size and shape according to the size of the reel of tape and the master sheet to which the envelope is to be secured.

Thus a primary object of the present invention is to provide an improved reel such as can be employed for flat reeling coded tape so as to result in a reel of tape which will lie flat and be easily inserted into an elongated envelope of a size and shape similar to the shape of the flat reel of tape.

Still another object of the present invention is to provide an improved reel upon which coded tape is adapted to be wound wherein the reel includes a crank rotatably mounted on a stand and an elongated flat element secured to the crank for rotation thereby, which element has its end edges formed with portions which are spaced apart a predetermined distance depending upon the size of the reel desired, and which taper inwardly so as to easily release the reeled tape after being wound.

Another object of the present invention is to provide an improved reel wherein the flat elongated element on which the tape is wound is disposed at an angle with respect to the crank arm so that it will assume an inclined relationship because of gravity acting on the crank arm which holds the same in a vertical relationship, thus facilitating engagement of the tape on the reel for initiating winding of the tape on the reel.

Still further objects of the present invention are to provide improved means for reeling and storing tape which does not materially add to the time required for normally storing such tape and wherein the mechanism employed is of simple and economical construction.

Various other objects and advantages will become apparent from the detailed description to follow.

Figures 1, 3:
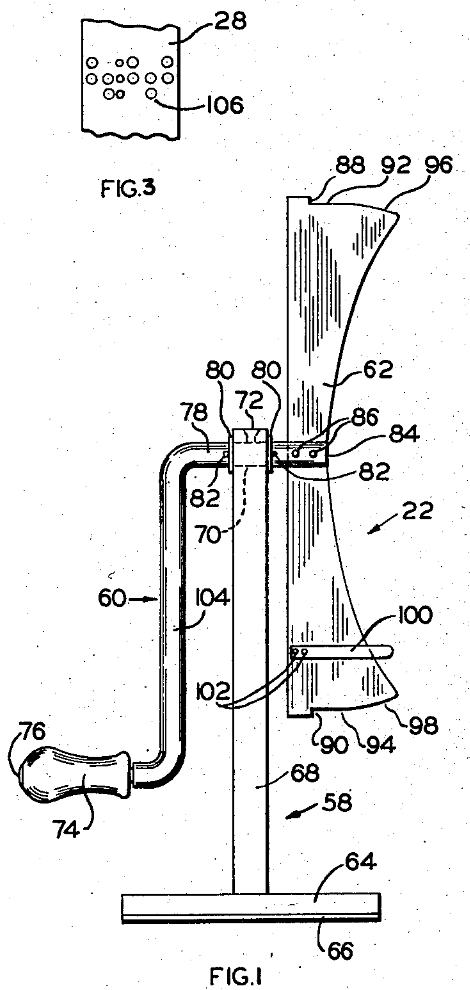
Figure 1 is a side elevational view of my improved reel for winding tape into flat reels.
Figure 3 is a view of a fragment of punched tape.

Looking now at Figures 1 and 2, the novel reel of the present invention will be described. The reel 22 is comprised of a stand 58, a crank 60 and a flat reeling element 62. The stand 58 is comprised of a heavy base plate 64 on the bottom surface of which is secured a thin sheet of material 66 roughened or otherwise treated so as to have friction qualities without marring wooden desk or table tops. The upper surface of the base 64 has upstandingly secured thereto a standard 68. The upper end of the standard 68 has a bore therethrough providing a bearing at 70 with an oil hole at 72 communicating therewith. The crank 60 has a handle 74 secured thereto as by a screw at 76, the handle 74 being rotatable relative to the crank 60. The crank shaft 78 extends through the bearing 70 so as to be rotatably supported thereby. Washers 80 are disposed on either side of the standard 68 and receive the crank shaft 78 therethrough, there being pins at 82 which retain the crank shaft 78 from longitudinal movement through the bearings 70. The end of the crank shaft 78 on the side of the standard 68 remote from the handle 74 is bifurcated at 84 so as to receive the elongated element 62 therebetween, there being a pair of rivets at 86 to rigidly secure the element 62 to the shaft 78.

The reel element 62 is formed of an elongated flat plate the end edges of which are formed with shoulders at 88 and 90 next to the arcuate tape engaging portions which are shown as two surfaces although a distinction of two surfaces need not occur. The first surface portions are 92 and 94 and may be substantially parallel and are adapted to receive the coded tape therearound during reeling. Extending from the first surface portions 92 and 94 are second tapering surfaces 96 and 98 respectively, the taper of these surfaces being such that upon sliding the reeled tape away from the abutment shoulders 88 and 90 the tape is easily disengaged from the reel as a unit. It will be understood that the spacing between the first surfaces 92 and 94 is preselected according to the length of the reel of tape desired which in turn depends upon the size of the envelope and the width of the master sheet to which the envelope is to be attached. In order to aid in the reeling of the coded tape, the flat plate 62 is provided adjacent one end with a spring retainer clip at 100 which is rigidly secured to the plate by a pair of rivets 102.

Figure 2:
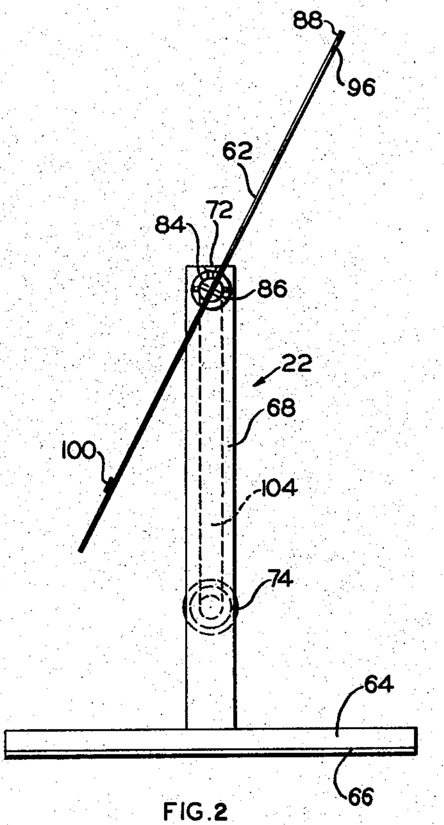
Figure 2 is a front elevational view of the reel of Figure 1.

Moreover, as is seen in Figure 2, the slot which forms the bifurcated end 84 is disposed at an angle with respect to the shank of the crank at 104 so that the weight of the crank normally maintains the plate 62 in an inclined relationship so that the tape can easily be engaged over the plate and beneath the spring retainer clip 100 when initiating the winding.

When it is desired to reel a section of coded tape 28, one end of the tape is engaged beneath the spring retainer clip 100 and then passed over the opposed arcuate surface portions. Then the crank can be operated so as to reel the tape over the flat plate 62 until completely wound. The flat reeled tape can then be removed by a sliding motion away from the shoulders 88 and 90 and will result in a neatly reeled coded tape section.

The removal of the tape is assisted by the concave edge of the plate 62 which has such concavity that the tape receiving surfaces 92, 96 extend to the right in Figure 1 a substantial extent beyond a tangent to the concave edge which is perpendicular to the axis of shaft 78, thus permitting the tape to be pinched by the fingers without gripping the plate 62.

In view of the foregoing it is believed that I have provided improved means for reeling coded tape sections.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

I claim:

1. A reel for flat reeling coded tape comprising a stand providing a bearing, a shaft rotatably carried in said bearing, a flat plate secured to said shaft and having a first arcuate concave edge surface with end edge tape receiving surfaces at each end of said arcuate surface and a further edge surface joining the said end edge surfaces, said end edge surfaces having abutments remote from said concave edge surface, said end edge surfaces defined by second arcuate surface portions which taper toward each other and extend from said abutments to the said first edge surface and said tape receiving surface portions being oriented with respect to the first concave edge surface so that a substantial portion thereof lies on the first edge surface portion side of a line tangent to said first arcuate edge surface and perpendicular to said shaft, whereby the arcuate extent of said second surface portions initiate release of the tape from the reel and said arcuate concavity is of a sufficient extent so that the tape may be gripped at the center thereof between the fingers of one's hand without pinching the plate of the reel, said flat plate having secured thereto at least at one end thereof a clip means which is adapted to receive and releasably anchor one end of the tape to be wound on the plate.

2. A reel as in claim 1 wherein the clip means comprises an arm extending generally in the direction parallel to the axis of the shaft and overlies the plate with its end toward the arcuate edge free and its other end fixed to the plate.

References Cited in the file of this patent

UNITED STATES PATENTS

| | | |
|---|---|---|
| 308,672 | Howd | Dec. 2, 1884 |
| 440,573 | Matteson | Nov. 11, 1890 |
| 622,695 | Kurth | Apr. 11, 1899 |
| 649,694 | Hunter | May 15, 1900 |
| 1,151,580 | Goetz | Aug. 31, 1915 |
| 1,434,097 | Conner | Oct. 31, 1922 |
| 1,494,619 | Nelson | May 20, 1924 |
| 1,573,220 | Clauss | Feb. 16, 1926 |
| 1,723,096 | Taylor | Aug. 6, 1929 |
| 1,855,986 | Rajotte | Apr. 26, 1932 |
| 1,855,989 | Rajotte | Apr. 26, 1932 |
| 2,375,679 | Obedin | May 8, 1945 |
| 2,382,476 | Glasoe | Aug. 14, 1945 |
| 2,545,212 | Ruf | Mar. 13, 1951 |